United States Patent [19]

Hanson

[11] 4,439,590
[45] Mar. 27, 1984

[54] ACETYLENE-TERMINATED AROMATIC ENYNE RESINS AND METHOD OF PRODUCTION THEREOF

[75] Inventor: Harry T. Hanson, Millburn, N.J.

[73] Assignee: Celanese Corporation, New York, N.Y.

[21] Appl. No.: 369,393

[22] Filed: Apr. 19, 1982

[51] Int. Cl.³ .............................................. C08F 138/00
[52] U.S. Cl. ................................... 526/285; 528/481; 528/503; 568/34; 568/315; 568/332
[58] Field of Search ............... 526/285; 568/34, 315, 568/332; 528/481, 503

[56] References Cited

U.S. PATENT DOCUMENTS

| | | | |
|---|---|---|---|
| 2,436,213 | 2/1948 | Hill | 526/285 |
| 3,235,516 | 2/1966 | Leonard | 568/34 |
| 3,832,331 | 8/1974 | Newton | 260/49 |
| 3,956,395 | 5/1976 | Meyer | 260/607 |
| 4,022,746 | 5/1977 | Kovar et al. | 260/30.2 |
| 4,098,767 | 7/1978 | Bilow | 526/262 |
| 4,100,138 | 7/1978 | Bilow et al. | 526/262 |
| 4,108,926 | 8/1978 | Arnold et al. | 526/285 |
| 4,131,625 | 12/1978 | Arnold et al. | 260/607 |
| 4,147,729 | 4/1979 | Zapancic et al. | 568/332 |
| 4,162,265 | 7/1979 | Arnold et al. | 260/578 |
| 4,178,428 | 12/1979 | Arnold et al. | 528/174 |

Primary Examiner—Harry Wong, Jr.
Attorney, Agent, or Firm—Burns, Doane, Swecker & Mathis

[57] ABSTRACT

Novel poly-aromatic ethynyl-terminated enyne compounds of the formula:

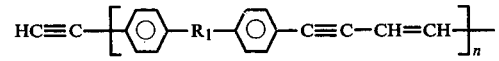

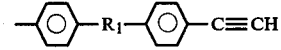

are provided together with a method of production thereof, wherein $R_1$ is a strong electron withdrawing moiety and n is equal to or greater than 1.

16 Claims, No Drawings

ACETYLENE-TERMINATED AROMATIC ENYNE RESINS AND METHOD OF PRODUCTION THEREOF

BACKGROUND OF THE INVENTION

This invention is directed to methods for producing aromatic enyne compounds and resins produced therefrom. More specifically, it relates to methods for producing such compounds which are acetylene-terminated (ethynylated), which can be used to prepare thermally stable relatively high molecular weight polymers having substantial ability to react further to form cross-linked, solvent resistant composites.

Acetylene-terminated resins have become very popular and are commercially employed in composite resin structures such as, for example, in aircraft and aerospace structures where high strength, lightweight materials capable of withstanding high temperatures are required. Examples of thermosetting acetylene-terminated resins are disclosed in U.S. Pat. Nos. 4,022,746; 4,098,767; 4,100,138; 4,108,926; and 4,131,625. Examples of resins having an internal enyne structure are disclosed in U.S. Pat. Nos. 4,178,428 and 4,162,265.

It is however desirable to provide acetylene-terminated resins which possess an internal aromatic enyne structure as well as a method of preparation thereof. It is also desirable to provide cross-linked thermoset resins comprised of such resins.

OBJECTS AND SUMMARY OF THE INVENTION

It is an object of the present invention to provide an acetylene-terminated compound having an internal aromatic enyne structure.

It is also an object of the present invention to provide a simplified procedure for producing an aromatic enyne compound which is acetylene-terminated.

It is further an object of the present invention to provide a thermoset resin comprised of such a compound.

There is thus provided a method for the production of an acetylene-terminated compound which method comprises heating in the presence of a strong base a compound having the structure:

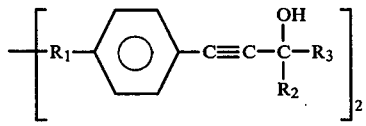

wherein $R_1$ is a strong electron-withdrawing moiety and is preferable either $-SO_2-$ or $-CO-$; $R_2$ and $R_3$ can be the same or different and are preferably selected from the group consisting of hydrogen and lower alkyl groups having from one to four carbon atoms, phenyl, and substituted phenyl, and where $R_2$ and $R_3$ can form a saturated 5 or 6-membered ring. Heating is continued until a material is obtained comprising a novel compound having the following structure:

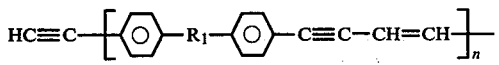

-continued

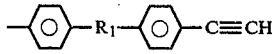

wherein $R_1$ is as defined above, and n is greater than or equal to one.

In accordance with the present invention there is also provided a novel compound of the structure:

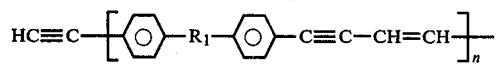

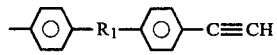

wherein $R_1$ is as defined above, and n is greater than or equal to one as well as novel thermoset resins comprised thereof.

DETAILED DESCRIPTION OF THE INVENTION

The novel compounds of the present invention can be prepared by use of a compound having the structure:

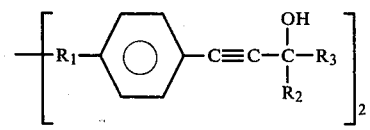

wherein $R_1$ is a strong electron-withdrawing moiety and is preferably either $-SO_2-$ or $-CO-$; $R_2$ and $R_3$ can be the same or different and are preferably selected from the group consisting of hydrogen and lower alkyl groups having from one to four carbon atoms, phenyl and substituted phenyl and where $R_2$ and $R_3$ can form a saturated 5 or 6-membered ring. Examples of such compounds include bis-(p-methylbutynol phenyl) sulfone and bis-(p-propynol phenyl) sulfone. The starting material can be prepared by any suitable procedure and the method of preparation of such materials forms no part of the present invention.

The novel compounds of the present invention may be prepared as follows. The starting compound is added to an organic solvent (which may be polar or non-polar) in an amount sufficient to dissolve all of the starting compound whereupon a strong base is then added. The solvent which is employed can be any one (or mixtures of several) which in fact dissolves the starting material and which is compatible with, but does not react with, the particular base selected. Suitable solvents include but are not limited to aromatic hydrocarbons, the higher ethers and ethoxylated and polyethoxylated solvents. A preferred solvent is toluene.

The strong base which is employed can be, for example, an alkali metal hydroxide, an alkali metal alkoxide or any other base sufficiently strong to attract the proton from the ethynyl group. A preferred base is sodium hydroxide. The base is preferably employed in a weight ratio ranging from about 1:1 to 1:10, based on the ratio of the base to the starting material. Since the base serves a catalytic and not reactive function, the amount of the base which is employed can be varied over a wide range, with greater amounts serving to enhance the rate of the reaction. It is also desirable in the event that a non-polar solvent is employed to include a minor amount of a polar compound in the admixture such as an alcohol to enhance the compatibility of the base in the admixture. Suitable polar compounds include but are not limited to alcohols such as methanol, ethanol, butanol and propanol. Such polar solvents, when present, are generally employed in a weight ratio of polar solvent to nonpolar solvent of about 1:1 to 1:10.

The mixture is heated with agitation until a major portion of the solvent or solvent mixture is distilled off. After cooling, the reaction product is extracted, dried and the remainder of the solvent is removed (preferably under vacuum). Generally, the residual material will also contain a minority of higher molecular weight oligomeric material. This material may be separated from the compound formed by any method suitable for that purpose.

Generally speaking, the longer the mixture is heated during compound preparation, the higher the molecular weight of the novel compound produced will be due to increased polymerization. Preferably, heating will be continued until the novel compound posseses between 1 and 10 repeating enyne units. Suitable reaction temperatures range from about 70° C. to about 120° C. The use of reaction temperatures in excess of about 120° C. may initiate undesirable cross-linking reactions and it is therefore desirable to employ a reaction temperature below about 120° C.

While not wishing to be bound by any particular theory or mechanism, it is believed that the reaction proceeds by the removal of the aldehyde or ketone moiety from the starting compound to yield the ethynyl group. The inductive effect of the strongly electron withdrawing moiety causes the hydrogen of this ethynyl group to be sufficiently acidic to yield a proton to the strong base generating a carbanion. The carbanion then adds to another terminal ethynyl group generating the enyne linkage.

The product which is produced will range in consistency from a viscous liquid to substantially solid depending upon the degree of polymerization achieved. A thermoset resin can be produced from the product of the present invention by subjecting the same to additional heating whereby cross-linking is initiated due to the presence of the acetylene bonds. The resinous product will generally at least need to be heated to a temperature in excess of the glass transition temperature thereof, although it may be necessary to additionally heat the resin to a temperature in excess of the resin flow temperature to achieve the desired cross-linking.

It should be noted that the cross-linking reaction which occurs is highly exothermic due to the degree of acetylene bonding which exists in the resin. As such, it may be desirable to form a blend of the resin with another high molecular weight, low functionality acetylene-terminated resin prior to such cross-linking in order to reduce the exothermic characteristics of the reaction. An exemplary high molecular weight, low functionality acetylene-terminated resin suitable for use in such a blend is marketed by Hughes Aircraft Co. under the tradename Thermid ®HR 600. The blending of such resins to reduce the exothermic characteristics of the cross-linking reaction is well-known to those skilled in the art and will not be discussed in greater detail herein.

The compounds of the present invention can be employed in various ways including use as a matrix material for composite materials, films, coatings, adhesives, etc. For example, the compounds of the present invention can be employed to bond two metallic sheets together or to serve as a matrix material for a fibrous web or sheet. The compound is initially employed in a non-cross-linked state and subsequently heated to initiate the desired cross-linking. Such uses are merely exemplary and others would be readily apparent to those skilled in the art.

The invention is additionally illustrated in connection with the following Example which is to be considered as illustrative of the present invention. It should be understood, however, that the invention is not limited to the specific details of the Example.

EXAMPLE 14.7 grams of the bis-(p-methylbutynol phenyl) sulfone of the formula:

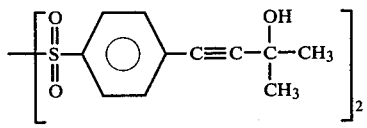

are added to a mixture of 250 milliliters of toluene, 100 millimeters of methanol, and 18 grams of sodium hydroxide. With argon continuously bubbling through it, the mixture is heated to a temperature below about 120° C. until the methanol is distilled off, and about 50 milliliters of toluene are distilled off. The flask is cooled and the contents extracted with water. The toluene layer is dried over magnesium sulfate and the toluene removed under vacuum to yield a yellow viscous oil quantitatively characterized by FT-IR and H-NMR as an aromatic acetylene-terminated enyne compound according to the present invention wherein n=1. Higher molecular weight oligomeric material is also produced and comprises about 10% by weight of the total resulting product.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A method for producing a poly-aromatic ethynyl-terminated enyne compound, comprising heating in the presence of a strong base a compound having a structure:

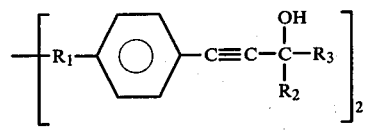

wherein $R_1$ is $-SO_2-$ or $-CO-$, and wherein $R_2$ and $R_3$ can be the same or different and are selected from the group consisting of hydrogen and lower alkyl groups having from one to four carbon atoms, phenyl, and substituted phenyl, and wherein $R_2$ and $R_3$ can form a saturated five or six membered ring.

2. The method of claim 1 wherein the resulting enyne compound possesses the structure:

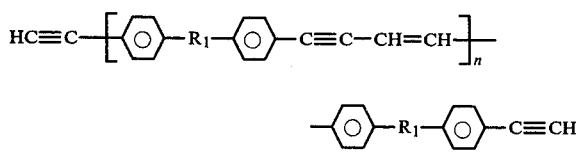

wherein n is 1 to 10.

3. The method of claim 1 wherein $R_2$ and $R_3$ is methyl.

4. The method of claim 1 wherein said strong base is selected from the group consisting of an alkali metal hydroxide and an alkali metal alkoxide.

5. The method of claim 4 wherein said strong base is an alkali metal hydroxide.

6. The method of claim 5 wherein said strong base is sodium hydroxide.

7. The method of claim 1 wherein said heating is to a temperature in the range of about 70° to 120° C.

8. The method of claim 1 wherein the weight ratio of said strong base to said compound being heated ranges from about 1:1 to 1:10.

9. The method of claim 1 wherein said compound being heated is heated subsequent to being dissolved in an organic solvent.

10. The method of claim 9 wherein said solvent comprises toluene.

11. The method of claim 1 wherein $R_1$ is sulfonyl.

12. The method of claim 1 wherein $R_1$ is carbonyl.

13. The method of claim 1 wherein $R_2$ and $R_3$ are methyl.

14. A compound having the structure:

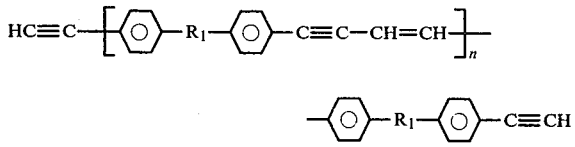

wherein $R_1$ is a member selected from the group consisting of $-SO_2-$ and $-CO-$; and wherein n is 1 to 10.

15. The compound of claim 14 wherein $R_1$ is sulfonyl.

16. The thermoset resin comprised of a cured product of the compound of claims 14 or 15.

* * * * *